United States Patent [19]

Hirsch et al.

[11] 4,209,033
[45] Jun. 24, 1980

[54] VACUUM BREAKER VALVE

[76] Inventors: Elder F. Hirsch, 520—21st St.;
Ronald F. Hirsch, 707 E. 20th, both
of Greeley, Colo. 80631

[21] Appl. No.: 966,098

[22] Filed: Jan. 31, 1979

Related U.S. Application Data

[63] Continuation-in-part of Ser. No. 641,074, Dec. 15, 1975.

[51] Int. Cl.² ............................................. F16K 24/02
[52] U.S. Cl. ...................................... 137/218; 137/360
[58] Field of Search ................................ 137/218, 360

[56] References Cited

U.S. PATENT DOCUMENTS

| 2,604,113 | 7/1952 | Barsano | 137/218 |
| 2,956,579 | 10/1960 | Moore et al. | 137/218 |
| 3,106,935 | 10/1963 | Gatzke | 137/218 |
| 3,785,394 | 1/1974 | Dixon et al. | 137/218 |
| 3,952,770 | 4/1976 | Botnick | 137/218 X |

Primary Examiner—Gerald A. Michalsky
Attorney, Agent, or Firm—Max L. Wymore

[57] ABSTRACT

Sill cock having novel vacuum breaking stem packing assembly to break a vacuum between the shut-off valve and the sill cock. A novel vacuum breaker shut-off valve is also provided adapted to close upon the presence of a vacuum or reduced pressure in the main water line.

3 Claims, 13 Drawing Figures

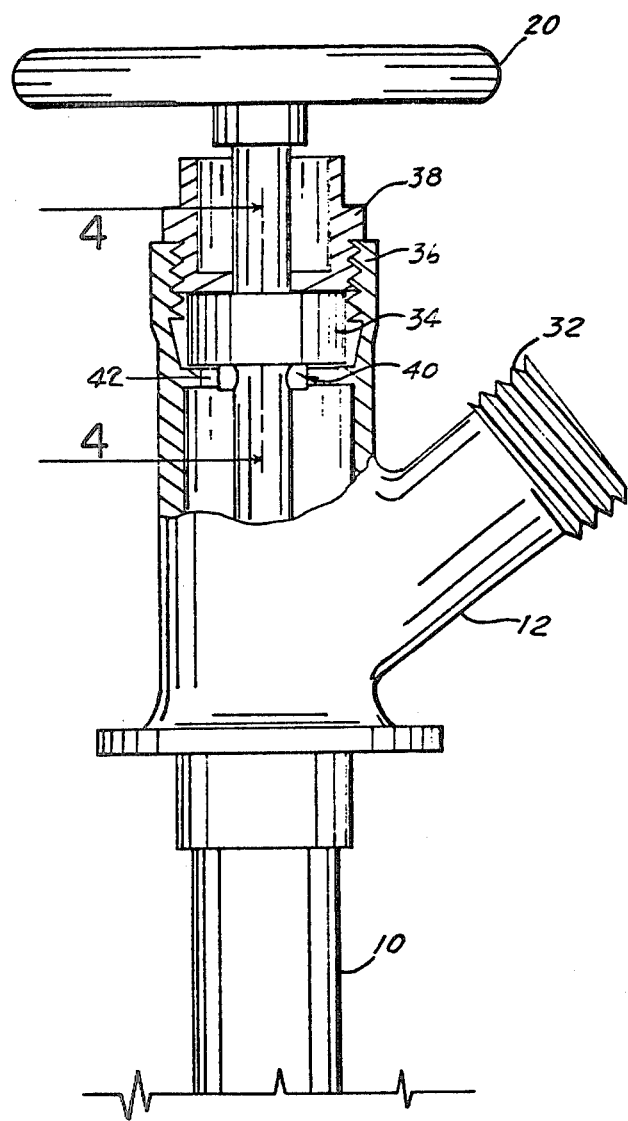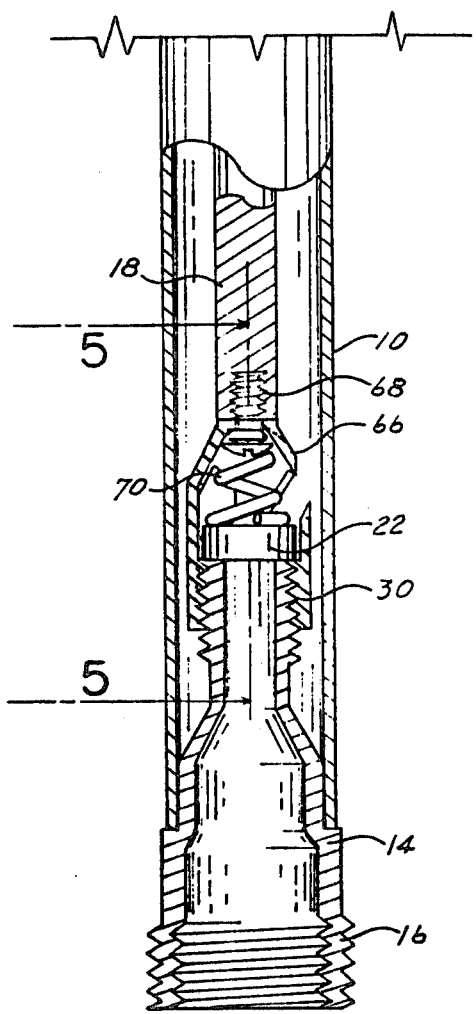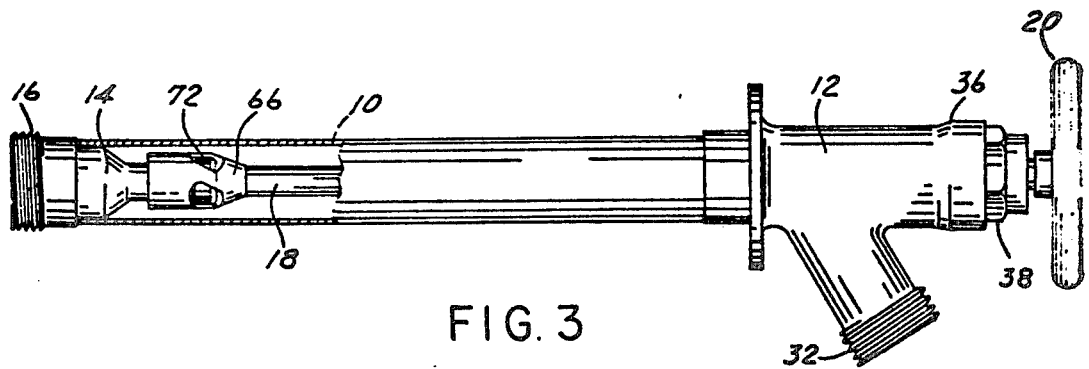

VACUUM BREAKER VALVE

The present application is a continuation-in-part of our application Ser. No. 641,074 filed Dec. 15, 1975 for VACUUM BREAKER VALVE AND STEM PACKING.

The present invention is directed to an improved sill cock of the no-freeze type where the shut-off portion of the valve is positioned on the inside of a building to prevent exposure to outside freezing temperatures and the operating handle is located outside the building for ease of use. This is arranged such that when the valve is closed, the water will drain from the exterior portion of the cock to avoid the water freezing. For the water to drain from the exterior portion of the cock, air must be permitted to enter the cock to replace the water. When a hose is connected to the cock it may prevent the flow of water into the cock and a partial vacuum will be formed therein. The vacuum may act to prevent the escape of water which can freeze and cause damage to the cock.

Also in an arrangement like this where the shut-off valve is open and a hose is connected to the cock, if water is being pumped from the main, such as a fire truck pumping water from a nearby fire hydrant, a vacuum will many times be pulled on the main causing any water in the hose to be drawn into the main, or at least into the residential system.

It is a principal object of the present invention to provide improved means for automatically breaking the vacuum in the exterior portion of a sill cock to allow same to drain freely and prevent freezing.

Another object of the present invention is to provide improved means for automatically closing the shut-off valve whenever a partial vacuum is caused to exist in the mains to prevent siphoning of contaminated water into the water supply.

Another object of the present invention is to provide an improved vacuum breaking valve stem packing that can be integrated into a sill cock of the floating shaft variety.

Another object of the present invention is to provide an improved combination vacuum breaking shut-off valve, floating valve stem and packing to prevent freeze up and siphoning of contaminated water into the water system.

Another object of the present invention is to provide an improved vacuum breaker valve and stem packing assembly whose construction is designed for simplicity, economy and efficiency.

For a better understanding of the present invention, together with other and further objects thereof, reference is had to the following description taken with the drawings and its scope will be pointed out in the appended claims.

BRIEF DESCRIPTION OF THE DRAWINGS

FIG. 1 is a side elevation of a sill cock according to the invention with a portion broken away to show the interior construction and partly broken to conserve space;

FIG. 2 is a side elevation of the shut-off valve portion of a sill cock according to the invention with a portion broken away to show the inner construction of the valve and partly broken to conserve space;

FIG. 3 is a side elevation of a modified anti-freeze sill cock with a portion broken away to show the shut-off valve according to the invention;

In FIG. 2 the shut-off valve is shown in normally open position with no water pressure on the valve;

Figure 4A:
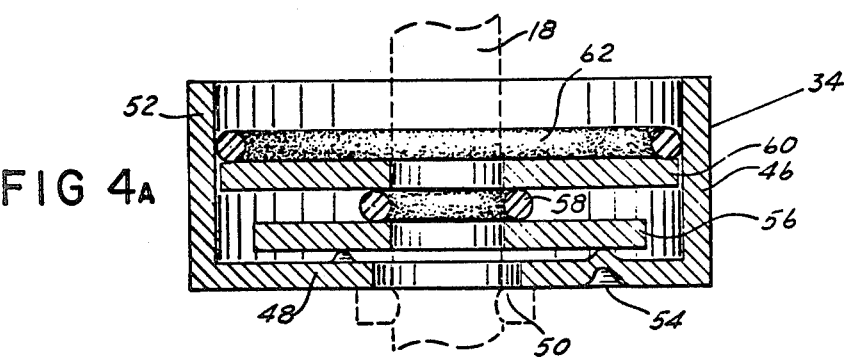
FIG. 4A is a cross sectional view along line 4—4 of FIG. 1 showing the valve stem packing assembly of the invention in vacuum releasing position.

The present invention is directed to an improved sill cock and incorporates many elements of a conventional sill cock. The sill cock comprises a wall tube 10 normally positioned through the wall of a building. A cock housing 12 is mounted on one end of the tube and positioned to be exterior of the building. At the opposite end of the tube there is mounted a valve housing 14 mounted on the interior extremity of the tube and is provided with threads 16 for connection to a water supply. A valve stem 18 extends axially through the interior of the tube and terminates at its outer extremity in a hand wheel 20. The other extremity is provided with a shut-off valve 22 according to the present invention as will be explained presently. The valve is provided with conventional valve actuating threads 30 for closure of the valve by means of the hand wheel.

The cock housing is normally provided with a hose spout 32 having exterior threads adapted to receive a hose coupling. As in the conventional sill cock when the hand wheel 20 is rotated clockwise, the valve 22 is forced against the valve seat of the valve housing 14 to shut off the water supply. When the valve is closed water remaining in the tube and housing should drain but if a hose is connected, the water therein may prevent air from entering the housing and tube such that the water remains and is subject to freezing with resultant damage.

To avoid retention of water in the housing according to the present invention there is provided vacuum valve means 34 replacing the usual valve stem packing which is adapted to admit air to the housing to break a vacuum and release any water therefrom.

Figure 6:
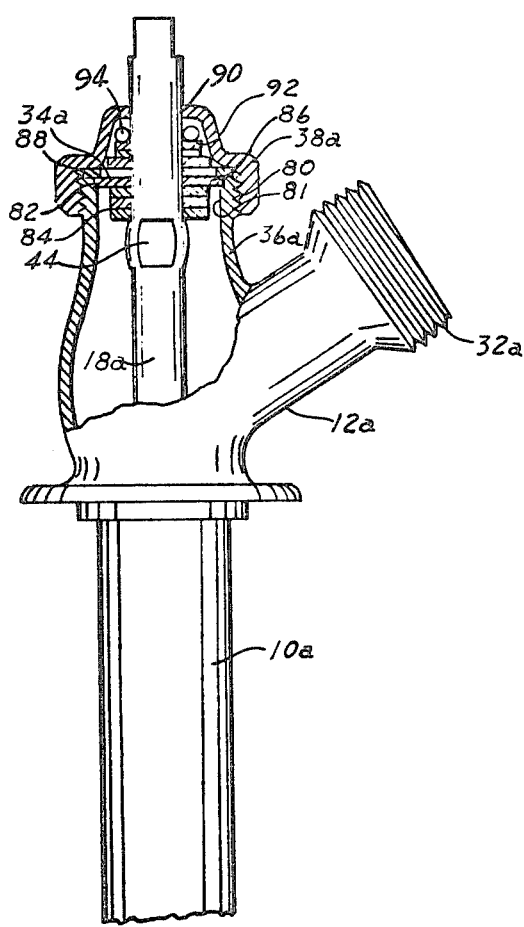
FIG. 6 is a side elevation of another embodiment of a sill cock according to the present invention with portions broken away to show the interior construction and partly broken to conserve space.

The vacuum valve means 34 is positioned on the valve stem 18 in housing 12 within the valve stem neck 36. A body member 38 is threaded into the internal threads of the neck 36. The valve stem 18 is provided with a stop means 40 which may be a pin 42 pressed through a hole in the stem as shown in FIG. 1 or an up-set portion 44 of the stem as shown in FIG. 6. In either version the stop means 40 serves to limit the inward positioning of the vacuum valve means 34 on the valve stem 18.

Figure 4B:
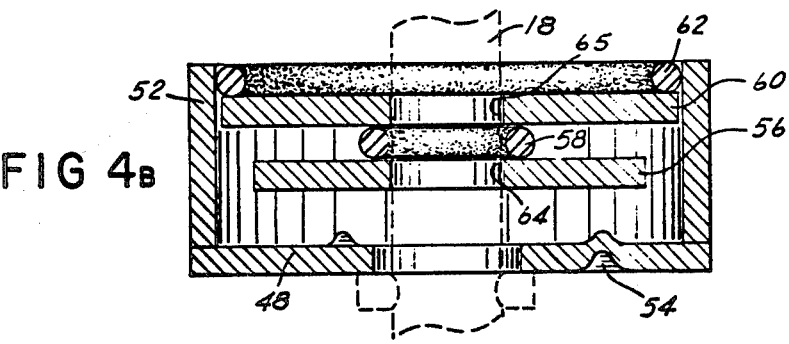
FIG. 4B is a cross sectional view along line 4—4 of FIG. 1 showing the valve stem packing assembly of the invention in sealing position.

Referring now to FIGS. 4A and 4B, it is seen that one form of the vacuum valve means 34 for use in the sill cock arrangement of FIGS. 1 and 2, wherein valve stem receiving outer end of the cock housing 12 is provided with internal threads, comprises a cup-shaped element 46 with a bottom 48 having an opening 50 therein somewhat larger than and receiving the valve stem 18. The element 46 has a peripheral upstanding wall portion 52 which may be connected to bottom 48 as a unitary structure or the bottom may be in the form of a flat washer and the walls formed by a separate length of tubing as depicted in FIG. 4B. The bottom 48 and walls 52 are sized to just be received within the threaded opening of neck 36 of the cock housing 12. Bottom 48 is also provided with a plurality of indentations 54 that provide for protuberances 55 on the inside of the bottom of the cup-shaped element 46. Within the walls of the cup element are provided in ascending order from the bottom, a washer 56, an O-ring 58, washer 60, and an O-ring 62. The washer 56 has a center hole 64 providing for a sliding fit on the valve stem 18 and has an outer diameter of a dimension at least sufficient to engage the protuberances 55 of the indentations 54. The protuberances 55 are for the purpose of preventing the washer 56 from seating in sealing relation with the bottom of the cup element. Other means may be provided to accomplish the same result such as protuberances on the bottom of the washer and the like. The O-ring 58 is sized to provide a near sealing fit about the valve stem but still permit sliding movement of the O-ring therealong. Washer 60 is provided with a center hole sized to provide a sliding fit on the valve stem and an outer diameter nearly as large as the inside diameter of the walls 52 of the cup element 46. The O-ring 62 is of a size to provide a sealing fit with the walls 52 of the cup element but still permit sliding movement therealong.

The embodiment of the vacuum release of FIGS. 1, 4A and 4B operates as follows. When the handwheel 20 is turned counterclockwise, valve 22 is opened as in FIG. 5A and water from the supply enters tube 10 and is discharged from sill cock 12. Since the water is under pressure, usually from 10 to 60 psi, water will pass through the space between the valve stem 18 and the edges of hole 50 in the bottom of cup element 48 and the force applied to the bottom of washer 56 will cause the washer 56 and O-ring 58, washer 60 and O-ring 62 to move upwardly in the drawings FIGS. 1, and 4A, to the position shown in FIG. 4B. The O-ring 62 is forced against the face of body member 38 by washer 60 and provides a seal therebetween preventing the escape of water. When the handwheel 20 is turned clockwise and a vacuum is produced in sill cock 12 and tube 10, the vacuum will cause, O-ring 62, washer 60, O-ring 58 and washer 56 to be moved in a downwardly direction toward the position drawn in FIG. 4A and the vacuum will be broken by the entry of air between the O-ring 62 and washer 60, past O-ring 58, washer 56 and through the hole 50 in the bottom 48 of the cup-shaped element to allow escape of any water that would be retained in the sill cock and tube.

Figure 5A:
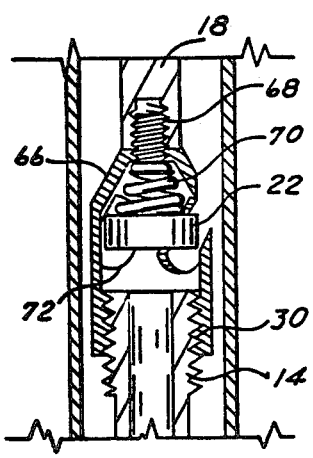
FIG. 5A is a cross sectional view along line 5—5 of FIG. 2 showing the shut-off valve in open position and water flowing.
Figure 5B:
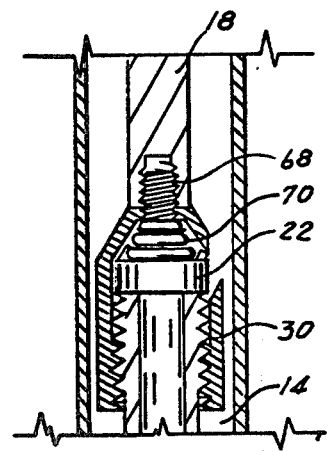
FIG. 5B is a cross sectional view along line 5—5 of FIG. 2 with the shut-off valve in closed position.

Referring now to FIGS. 2, 5A and 5B, there is shown a shut-off valve 13 of the sill cock incorporating the improved arrangement according to this invention. A valve cage 66 is secured to the end of the valve stem 18 opposite the handwheel by means of a screw 68 which also secures spring 70 supporting the valve closure 22. Valve cage 66 is provided with plurality of openings 72 for escape of water when the valve 22 is out of engagement with valve seat 74 at the inner end of valve housing 14. The valve cage 66 is provided with activating threads 30 and the inner end of valve housing 14 is provided with mating threads. The shut-off valve is shown in the closed position in FIG. 5B as by the turning of the handwheel 20 in a clockwise direction. In FIG. 5A, the shut-off valve is in the open position with water pressure assisting in holding the valve 22 open againsst the bias of spring 70. In FIG. 2 the valve is in the normal open position depicted in FIG. 5A; however, the water pressure in the main is near zero or at a vacuum. This condition can occur where a pumper may be pumping water from a nearby fire hydrant. When a vacuum occurs in the supply line, the spring 70 biases the valve 22 into the water supply lines of the building or residence and possibly into the mains which would result in the contamination of the supply.

Figure 7:
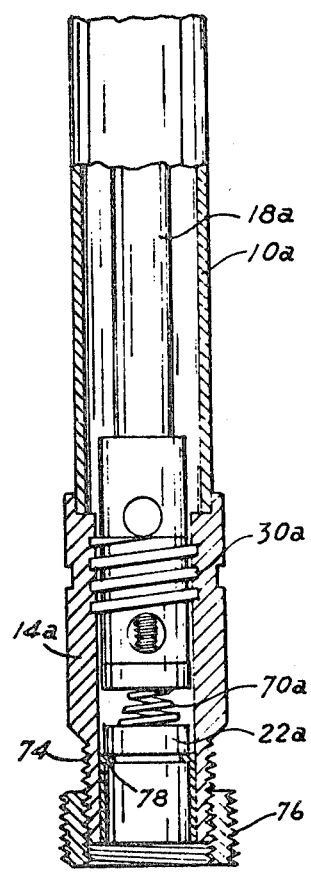
FIG. 7 is a side elevation of the shut-off valve portion of a sill cock according to the present invention with a portion broken away to show inner construction and partly broken to conserve space.

Referring now to FIGS. 6 and 7, there is shown another embodiment of the present invention. The corresponding parts of the embodiments of FIGS. 1 through 5 are given the same reference numeral with a subscript. Again the sill cock is seen to comprise a wall tube 10a to extend through a wall of a building. The cock housing 12a is mounted on the exterior end of the tube. A valve housing 14a is mounted at the opposite end of the tube and provided with threads 16a to connect to a water supply. A valve stem 18a is axially positioned within the tube to extend from the valve housing to a point exterior of the cock housing where it is adapted to be fitted to a handwheel 20a. The other end of the valve stem is provided with a shut-off valve 22a secured thereto with a spring 70a to provide for axial movement of the valve 22a with respect to the valve stem against the bias of the spring. The spring 70a may conventionally be a helical spring that collapses within itself on being compressed. The valve is provided with conventional valve actuating threads 30a for closure of the valve by means of a handwheel. The valve housing 14a is provided with internal mating threads that mate with threads 30 of the valve. At the outer extremity, valve housing 14a is provided with external threads 74. A threaded collar 76 having both internal and exterior threads is threaded to threads 74 and a valve seat 78 is secured to collar 76 and positioned within the valve housing 14a to receive the valve 22a in sealing relation. The external or internal threads of collar 76 are adapted to threadedly receive the mating threads of a water supply line. Valve 22a is shown in the open position but with zero or negative water pressure in the line such that valve 22a is biased closed by the spring 70a to prevent siphoning of contaminated water into the supply line.

Referring now to FIG. 6 in particular, the cock housing 12a has an opening 81 through which the valve stem extends and external threads 80 are provided to receive a valve stem bushing 38a in threaded relation. A shoulder 87 is provided at the inside outward extremity to normally receive the valve stem packing. According to the present invention, a spacer 84 or a series of spacers, normally metal, are positioned above the stop means 44 to support a washer 86 of a size to be received in contact within the shoulder 82. A sealing washer 88, which may be a fiber washer is received within the bushing 38a and is squeezed in sealing relation between the bushing 38a and the end of the opening of cock housing 12a. The bushing 38a is provided with an opening 90 through which the valve stem extends and the space within the bushing between washer 86 and opening 90 is occupied by a spacer 92 which may be a plurality of washers and an O-ring 94 sized to slidably receive the valve stem is positioned thereon between the spacer 92 and the opening 90 of the bushing 38a. Thus, when water pressure is present within the cock housing, the spacer 92 will cause O-ring 94 to seal the opening 90 but when a vacuum is created within the cock housing the O-ring 94 and the spacer 92 is permitted to unseal the opening 90 and relieve the vacuum.

The present invention is designed to include elements of a conventional sill cock. These elements comprise a wall tube 110 normally positioned through the wall of a building. The cock housing 112 is mounted on one end of the tube and positioned to be exterior of the building. At the other end of the tube there is mounted a valve housing 114 mounted on the interior extremity of the tube and is provided with threads 116 for connection to a water supply. A valve stem 118 extends axially through the interior of the tube and terminates at its outer extremity in contact with handwheel 120. The other extremity is provided with a shut-off valve 122 secured to the valve stem by means of a threaded bolt 123 and the like. The valve stem 118 is of the floating type, that is it is not fastened to the handwheel 120, as in the non-floating type arrangement. The valve is provided with actuating threads 130 on the outer end of body member 138.

The cock housing is normally provided with a hose spout 132 having exterior threads adapted to receive a hose coupling. As in the conventional sill cock when the handwheel 20 is rotated clockwise, the valve 122 is forced against the valve seat 115 of the valve housing 114 to shut-off the water supply. When the valve is closed, water remaining in the tube and housing should drain but if a hose is connected, the water therein may prevent air from entering the housing and tube such that the water remains and is subject to freezing.

To avoid retention of water in the housing according to the present invention there is provided vacuum valve means 134 in place of the usual valve stem packing which is adapted to admit air to the housing 114 to break a vacuum and release any water therefrom.

Figure 8:
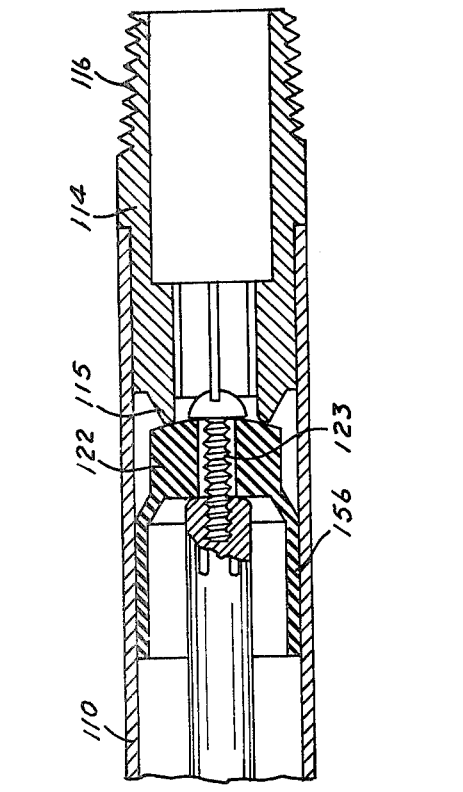
FIG. 8 is a side elevation of a sill cock according to the present invention partly in cross section and partly broken away to conserve space and to show the internal construction of the valve, showing the sill cock valve in closed position and the vacuum relief open.

The vacuum valve means 134 is positioned on the valve stem 118 in housing 112 within the valve stem neck 136. A body member 138 is threaded into the internal threads of the neck 136. The valve stem 118 is provided with a stop means 140 which may be a pin 142 pressed through a hole in the stem as shown in FIG. 8. The stop means 140 serves to limit the inward positioning of the vacuum valve means 134 on the valve stem 118.

The valve means 134 is seen to be located within the valve stem neck and within the axial bore 137 of body member 138. The bore 137 is of larger diameter than the valve stem 118 to provide a clearance therebetween. The inner end of the body member 138 is provided with a larger bore 139 to provide a shoulder 141. Positioned on the valve stem 118 progressing outwardly from stop 142 may be a spring 146, a washer 148, an O-ring 150 and another washer 152 followed by a stop 154. The stop 154 is seen to comprise a pin pressed through a hole through the valve stem 118. The pin of stop 154 is of a length to be received within the diameter of bore 137 in body member 138. The O-ring 150 is sized to provide a near sealing fit with the valve stem but still provide sliding movement of the O-ring therealong. Washers 148 and 152 are provided with a center hole sized to provide a sliding fit on the valve stem and an outer diameter nearly as large as the inside diameter of the bore 139.

The embodiment of the vacuum release of FIGS. 8-11 operates as follows. With the valve connected to a source of water under pressure, when the handwheel 120 is turned counterclockwise, valve 122 is opened as in FIG. 9 and water enters the wall tube via the valve seat 115, past valve 122. The water pressure, i.e. 10 to 60 psi, will pass through the space between the valve stem 118 and the bore 137 of the body member 138 as well as through bores 139. The flow of water past the washers 148 and 152 cause the washers to move outwardly or to the left in FIG. 8 such that the washer 152 is pressed into sealing contact with the shoulder 141, and O-ring 150 is sealed between washers 148 and 152 to seal about the valve stem, FIG. 9. When the handwheel 120 is turned clockwise and a vacuum is produced in sill cock 12 and tube 10, the vacuum will cause washer 148, O-ring 150 and washer 152 to be moved to the right or inwardly, FIG. 8, and the vacuum will be broken by the entry of air through bores 139, between washer 152 and shoulder 141, past O-ring 150 and washer 152 to allow escape of any water that would be retained in the sill cock and tube.

Referring also to FIGS. 8-11, there is shown a shut-off valve of a sill cock including a further improved embodiment according to this invention. The valve 122 is provided with a flexible pheripheral skirt 156 which deflects upon water entering the valve from a supply under pressure, as in FIG. 9, to allow water to pass the valve 122 and enter tube 110. When the valve 122 is either open or not quite closed or provides a faulty closure, a vacuum pulled in the supply line which might occur, for example, if a fire engine pumper were pumping water from a nearby fire hydrant, a vacuum occurs in the supply line and the skirt 156 flares outwardly sealing off the tube 110 to the left of the skirt from the tube to the right of the skirt preventing any water within the sill cock 112 or hose connected thereto from being drawn into the supply line.

Figure 9:
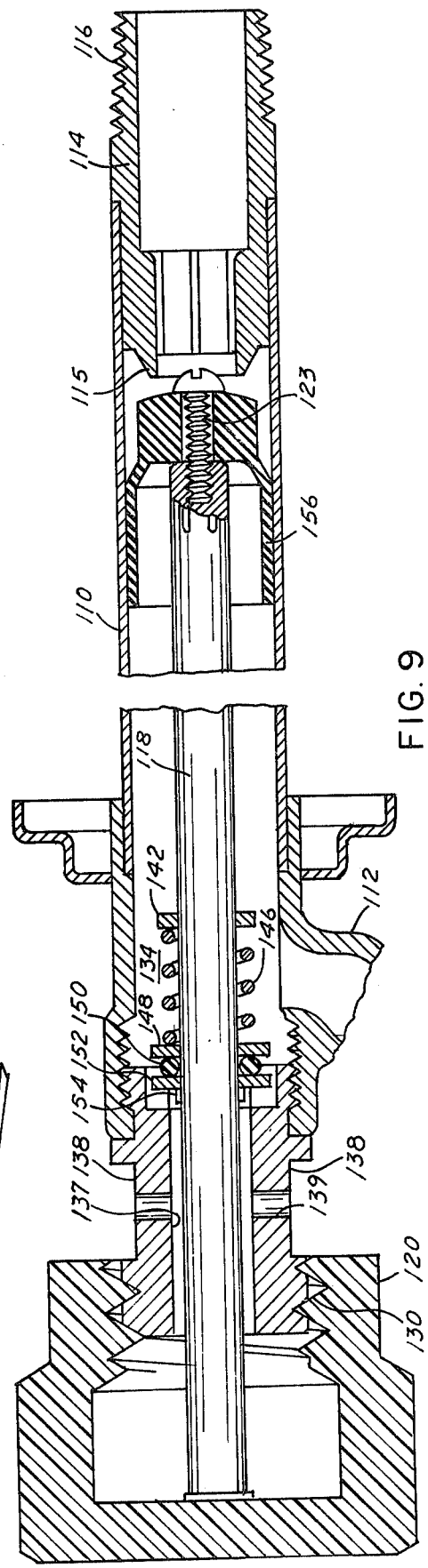
FIG. 9 is a side elevation of a sill cock according to the present invention partly in section and partly broken away to show the internal construction of the valve, showing the sill cock valve and the vacuum relief in open position.
Figure 10:
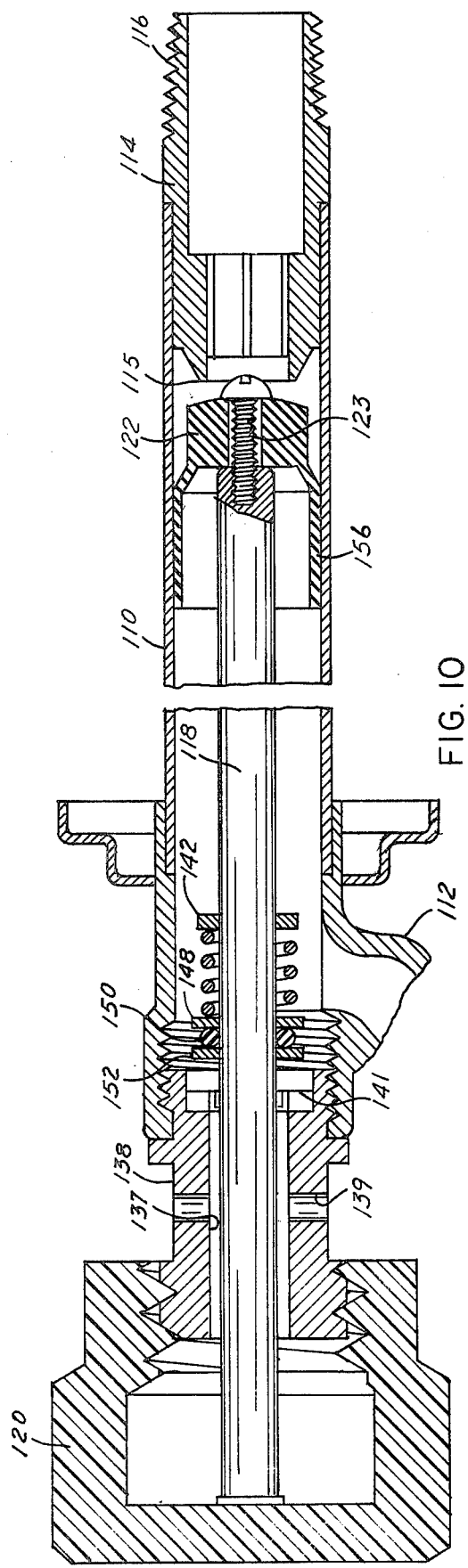
FIG. 10 is also a side elevation of a sill cock according to the invention partly in section and partly broken away to conserve space, showing the sill cock in open position and the vacuum relief open without spring loading; and, FIG. 11 is a side elevation of the sill cock of the present invention partly in section and partly broken away to conserve space and absent a vacuum relief.
Figure 11:
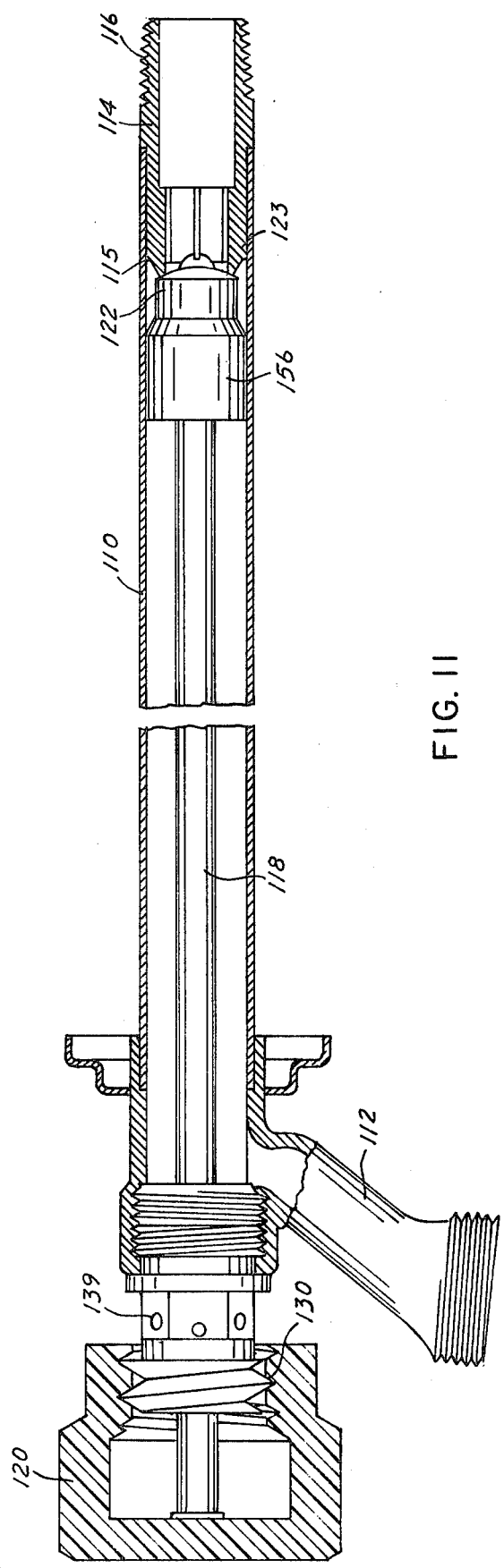

It should be noted that the spring 146 of the vacuum valve means 134 is not mandatory and where used it will provide a spring bias only sufficient a move valve 122 to within about ⅛ inch from seating with a hose of line pressure and the valve open as in FIG. 9.

Back pressure through the sill cock will also cause the skirt 156 to flare and seal the introduction of water in the tube 110 to the left of the valve to enter the supply line. Of course, vacuum in the supply line will close the valve skirt 156 and release the relief valve 134. Further, the outer pin 154 may be positioned with respect to the shoulder 141 to move the washer 152 to the right and break the relief seal whenever the valve 122 is fully seated.

Thus, it is seen that applicant's invention solves both the problem of breaking a vacuum within the cock housing to allow water to escape and avoid freezing problems and further to close the shut-off valve whenever a near zero or negative pressure occurs in the supply line.

What is claimed is:

1. In a sill cock comprising an external cock housing; an internal supply shut-off valve, a wall tube connecting said housing to said valve; a valve stem extending from said valve outwardly through said housing, and a body member having an opening receiving the stem threadably secured to the cock housing in water tight relation the improvement comprising stop means positioned on said valve stem within the cock housing, a one way valve means positioned on said valve stem against said stop means adapted to selectively seal the annular opening between the stem and the body member when a positive pressure is present within the cock housing and to unseal the opening between the stem and the body member when a negative pressure is present in the cock housing wherein the improvement further includes resilient skirt means peripherally attached to the shut-off valve adapted to flare and provide a water tight seal in the wall tube between the inlet and outlet side of the valve which has been opened under normal water supply water pressure, in the absence of water pressure in the cock housing.

2. The invention according to claim 1 wherein the one-way valve means comprises a body member having a circular recess therein having a bottom and upstanding walls, with the bottom having an opening therein receiving the valve stem, a first washer element having a center opening sized to receive the valve stem in sliding relation, an O-ring positioned adjacent the first washer of a size to provide a seal between the first washer and the valve stem, a second washer adjacent the O-ring having a center opening receiving the valve stem in sliding relation wherein water pressure within the cock housing causes said first washer, O-ring, and second washer to be moved towards the bottom of the circular recess into sealing relation between the second washer, the upstanding walls of the circular recess and the body member and to force the O-ring into sealing relation between the first washer and the valve stem and the valve stem and the second washer.

3. The invention according to claim 2 wherein a second stop means is provided on the valve stem and resilient means are positioned therebetween and the bottom of the circular recess and adapted to bias the first washer, O-ring and second washer out of sealing contact with the bottom of the recess in the absence of water pressure in the cock housing.

* * * * *